(12) United States Patent
Carstensen et al.

(10) Patent No.: US 8,920,594 B2
(45) Date of Patent: Dec. 30, 2014

(54) COMPOSITE THERMOPLASTIC MATRIX AIRFRAME STRUCTURE AND METHOD OF MANUFACTURE THEREFORE

(75) Inventors: Thomas Carstensen, Shelton, CT (US); William V. Forster, Oxford, CT (US); Christian A. Rogg, New Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1737 days.

(21) Appl. No.: 11/493,052

(22) Filed: Jul. 26, 2006

(65) Prior Publication Data

US 2011/0011518 A1    Jan. 20, 2011

Related U.S. Application Data

(60) Provisional application No. 60/705,032, filed on Aug. 3, 2005.

(51) Int. Cl.
*B32B 37/00* (2006.01)
*B64C 27/04* (2006.01)
*B64C 1/06* (2006.01)

(52) U.S. Cl.
CPC .. *B64C 27/04* (2013.01); *B64C 1/06* (2013.01)
USPC .................. 156/300; 156/308.2; 244/119

(58) Field of Classification Search
USPC ............. 156/256, 297, 308.2, 309.6, 65, 265, 156/278, 299, 300, 71, 264; 264/319; 244/119
See application file for complete search history.

(56) References Cited

U.S. PATENT DOCUMENTS

| | | | |
|---|---|---|---|
| 4,151,031 A * | 4/1979 | Goad et al. ................ | 156/201 |
| 4,593,870 A | 6/1986 | Cronkhite et al. | |
| 4,757,665 A | 7/1988 | Hardigg | |
| 4,968,383 A | 11/1990 | Volkmann et al. | |
| 5,050,299 A | 9/1991 | Rainville | |
| 5,242,523 A | 9/1993 | Willden et al. | |
| 5,362,347 A | 11/1994 | Domine | |
| 5,460,865 A | 10/1995 | Tsotsis | |
| 5,508,085 A | 4/1996 | Lockshaw et al. | |

(Continued)

FOREIGN PATENT DOCUMENTS

| | | |
|---|---|---|
| DE | 1921798 | 2/1971 |
| GB | 1265962 | 3/1972 |

(Continued)

OTHER PUBLICATIONS

Pages 9 and 10 of the Aircraft Structures chapter of an FAA Bulletin included in the amendment after final submitted by applicants on Jul. 17, 2009. The date the FAA Bulletin published is unknown.*

(Continued)

*Primary Examiner* — John Goff
(74) *Attorney, Agent, or Firm* — Carlson, Gaskey & Olds, P.C.

(57) ABSTRACT

A thermoplastic matrix airframe structure section includes a multitude of thermoplastic matrix frame members and a multitude of thermoplastic matrix beam members which form a substructure, which receives a thermoplastic matrix inner cap grid structure, a thermoplastic matrix outer cap grid structure, and a thermoplastic matrix skin which are in-situ co-bonded to the substructure to significantly strengthen and unify the substructure.

20 Claims, 8 Drawing Sheets

(56) References Cited

U.S. PATENT DOCUMENTS

| | | | |
|---|---|---|---|
| 5,556,565 A | | 9/1996 | Kirkwood et al. |
| 5,660,669 A | | 8/1997 | Mittleider |
| 5,688,426 A | * | 11/1997 | Kirkwood et al. ............ 219/633 |
| 5,739,468 A | * | 4/1998 | Rossman et al. ............. 174/669 |
| 5,829,716 A | | 11/1998 | Kirkwood et al. |
| 5,837,181 A | | 11/1998 | Leimbacher et al. |
| 5,897,078 A | | 4/1999 | Burnham et al. |
| 6,033,511 A | * | 3/2000 | Farley ........................... 156/180 |
| 6,427,945 B1 | | 8/2002 | Bansemir |
| 6,511,570 B2 | | 1/2003 | Matsui |
| 6,749,076 B2 | | 6/2004 | Fingerhut et al. |
| 6,802,931 B2 | | 10/2004 | Fujihira |
| 2001/0030380 A1 | * | 10/2001 | Fujihira ....................... 264/212 |
| 2001/0035249 A1 | * | 11/2001 | Kondo et al. .................. 156/65 |
| 2004/0055248 A1 | * | 3/2004 | Grillos ........................ 52/783.1 |
| 2006/0243860 A1 | * | 11/2006 | Kismarton ................... 244/132 |

FOREIGN PATENT DOCUMENTS

| | | |
|---|---|---|
| GB | 2134059 | 8/1984 |
| WO | 9518013 | 7/1995 |
| WO | 2008039168 | 4/2008 |

OTHER PUBLICATIONS

"Wing Bonding Process" page included in the amendment after final submitted by applicants on Jul. 17, 2009. The date the page published is unknown.*

International Search Report and Written Opinion dated Jul. 18, 2008 for International Application No. PCT/US06/29418.

European Search Report for European Patent Application No. 06851609.5 dated Oct. 25, 2012.

* cited by examiner

COMPOSITE THERMOPLASTIC MATRIX AIRFRAME STRUCTURE AND METHOD OF MANUFACTURE THEREFORE

The present invention claims the benefit of U.S. Provisional Patent Application No. 60/705,032, filed Aug. 3, 2005.

This invention was made with government support under Contract No.: DAAH10-03-2-0003. The government therefore has certain rights in this invention.

BACKGROUND OF THE INVENTION

The present invention relates to an airframe, and more particularly to a thermoplastic matrix airframe section with an in-situ co-bonded thermoplastic fiber cap grid structure and skin which is integrated with a substructure on the fly without subsequent autoclave post processing.

Composite airframe structures for rotary wing aircraft are traditionally fabricated by two techniques: discrete part build up and fully integrated structures. Each of these processes contains various tradeoffs.

The process of manufacturing unique components and subsequently fastening or bonding the plurality of components together is laden with high recurring part cost and non-recurring tooling costs. Each unique composite component requires discrete mold, trim, fixture, and ply location tools or templates. These tools are required for each unique component within the assembly.

Once the plurality of unique individual components are manufactured, they are assembled in an assembly fixture for mechanically fastened structures, or in a bond fixture for bonded structures. Each of these assembly processes requires significant labor associated with lay-up, machine time, and hand assembly.

Fully integrated composite assemblies join the plurality of discrete uncured and cured composite components prior to the cure cycle. This results in a single unitized structure after cure. Although the total quantity of tools for this process may be less than that required for a discrete part assembly, tooling tolerances and quality issues may be more significant. Additionally, although the touch labor associated with a unitized structure is essentially the same prior to cure, a fully integrated composite assembly generally results in reduced touch labor after autoclave curing since less assembly is required. However, relatively expensive non-recurring tooling requires significant time duration for lay-up and cure which significantly limits the amount of product throughput.

In general, fabrication of discrete part build-up with separate, dedicated tooling is costly and time consuming. Fabrication of unitized structures reduces assembly labor, however, tool complexity is increased which reduces product throughput.

Accordingly, it is desirable to provide a composite airframe structural section as an essentially engineered commodity assembly and a method of manufacture therefor which capitalizes on manufacturing economies of scale to achieve lower cost airframe sections.

SUMMARY OF THE INVENTION

A thermoplastic matrix airframe structure section according to the present invention includes a multitude of thermoplastic matrix frame members and a multitude of thermoplastic matrix beam members which form a substructure to receive a thermoplastic matrix inner cap grid structure, a thermoplastic matrix outer cap grid structure, and a thermoplastic matrix skin which are in-situ co-bonded to the substructure.

The thermoplastic matrix beam members and the thermoplastic matrix frame members are preferably cut to length from a commodity-type beam and frame member, respectively, for assembly into the substructure rather than being specifically fabricated as discretely tailored components for particular location within the substructure. Although tailored beam and frame members may not be economically as attractive as commodity structures, such structures can be substituted with no change in technical performance. Subsequent to being cut to length from the commodity-type member, each thermoplastic matrix beam member and thermoplastic matrix frame member may be apertured to provide weight-reduction and/or openings, as necessary, for components such as conduits, hoses, wiring harnesses, etc. which pass through the airframe section.

Once individually cut to length and apertured, the multitude of thermoplastic matrix beam members and the multitude of thermoplastic matrix frame members may be in-situ co-bonded to one of the outer and/or inner cap grid structure. Subsequently, the multitude of thermoplastic matrix beam members and the multitude of thermoplastic frame members may be joined and/or bonded to each other to form a grid-like substructure. Thereafter, the remaining cap grid structure may be in-situ co-bonded to the multitude of thermoplastic matrix beam members and the multitude of thermoplastic matrix frame members. It should be noted that alternate arrangements are envisioned, for example, the multitude of thermoplastic matrix beam members and the multitude of thermoplastic frame members may be joined and/or bonded to each other prior to co-bonding the substructure to the inner and outer cap grid structures, respectively. Furthermore, the multitude of thermoplastic matrix beam members and the multitude of thermoplastic frame members may be in-situ co-bonded to both the inner and outer grid structures prior to being joined to each other. Alternatively, the outer skin may be integrally formed with the outer cap grid structure. Mechanical fasteners, bonding, or autoclave processing may also alternatively be utilized.

The in-situ process joins one thermoplastic layer to another on the fly, eliminating autoclave preparation and subsequent post processing. The inner cap grid structure and the outer cap grid structure tie together the outer cap surfaces of the multitude of thermoplastic matrix beam members and the multitude of thermoplastic matrix frame members thereby increasing the stiffness and rigidity of the substructure, which significantly strengthens and unifies the substructure.

The present invention therefore provides a composite airframe structural section as an essentially engineered commodity assembly and a method of manufacture therefor which capitalizes on manufacturing economies of scale to achieve lower cost airframe sections.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
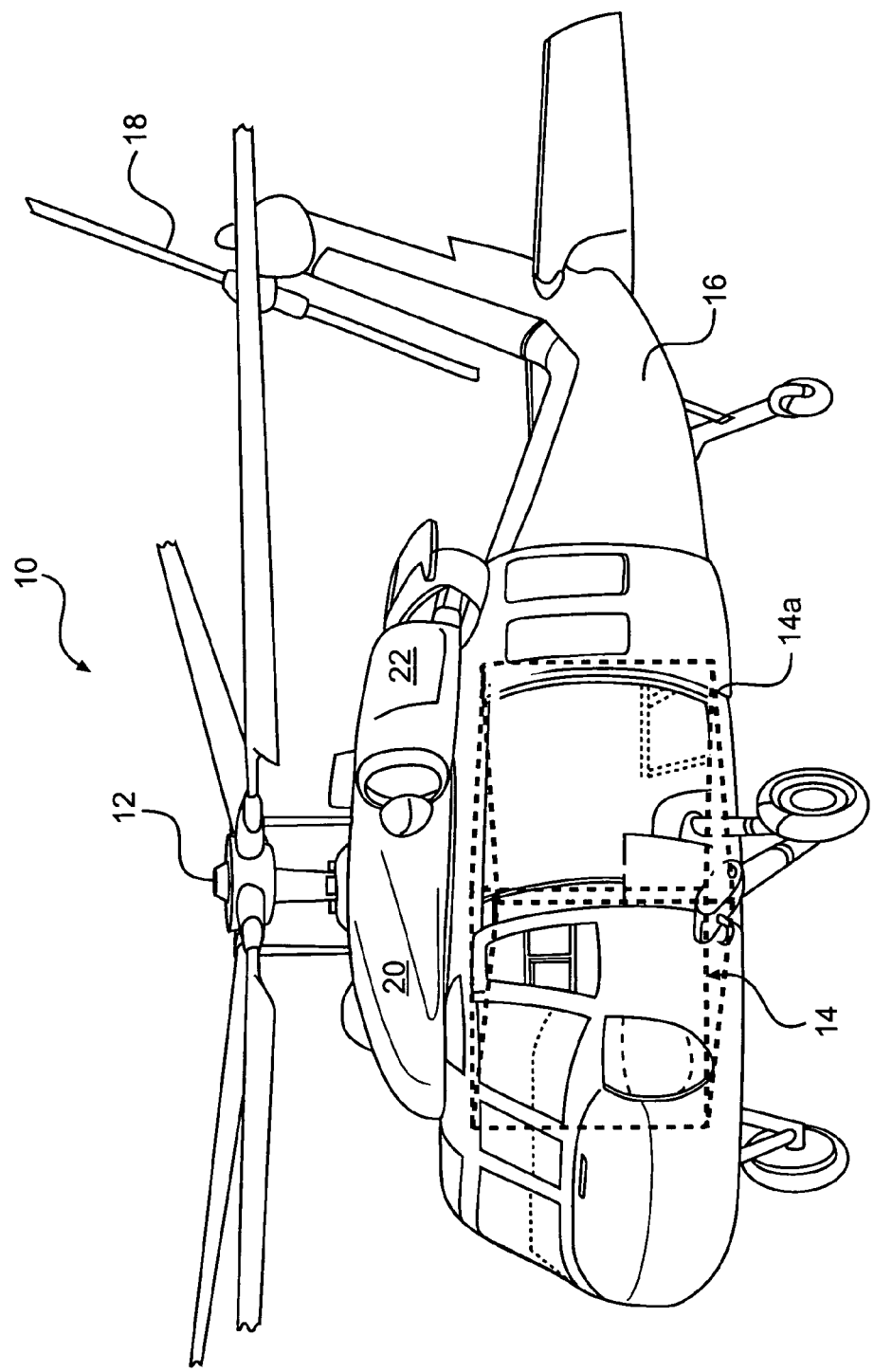
FIG. 1A is a general perspective view an exemplary rotary wing aircraft embodiment for use with the present invention.

FIG. 1A schematically illustrates a rotary-wing aircraft 10 having a main rotor assembly 12. The aircraft 10 includes an airframe 14 having an extending tail 16 which mounts an anti-torque rotor 18. The airframe 14 includes an airframe section 14a. The main rotor assembly 12 is driven through a transmission (illustrated schematically at 20) by one or more engines 22. Although a particular helicopter configuration is illustrated in the disclosed embodiment, other machines such as turbo-props, tilt-rotor and tilt-wing aircraft will also benefit from the present invention.

Figure 1B:
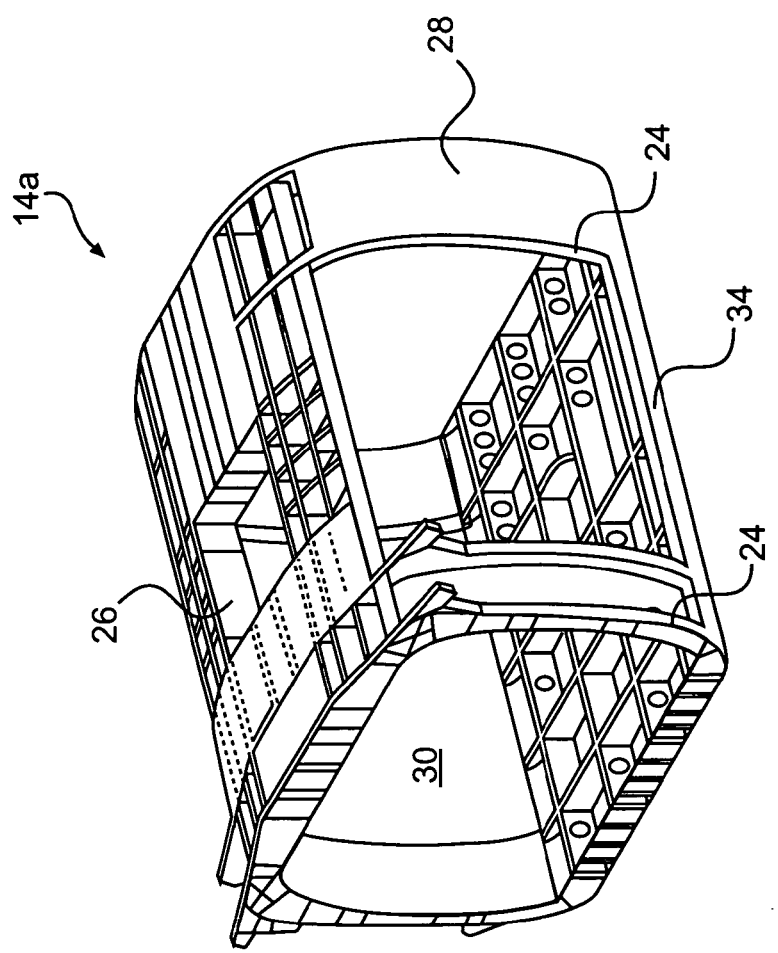
FIG. 1B is a general perspective view a cabin section of the rotary wing aircraft of FIG. 1A.

Referring to FIG. 1B, the airframe section 14a, here illustrated as a cabin section, may include, inter alia, a multitude of frame members 24 and a multitude of beam members 26 which support an aircraft outer skin 28. The airframe section 14a may also include one or more open areas 30 located through the aircraft outer skin 28. The multitude of frame members 24 and beam members 26 are preferably arranged in a generally rectilinear pattern, however, any arrangement may be used with the present invention.

The airframe section 14a is itself preferably assembled from a multitude of generally planar rectilinear airframe structure sections 34. As illustratively shown in FIG. 1C, one airframe structure section 34 may be the lower fuselage airframe structure section 34. It should be understood, however, that various other airframe structure sections may also be manufactured in accordance with the present invention.

The airframe structure section 34 is preferably manufactured from a non-metallic material, which may be assembled together with other airframe sections of non-metallic or metallic materials. Most preferably, the airframe structure section 34 is manufactured primarily from a thermoplastic composite matrix material including, but not limited to, PEEK, PEKK, Ultem, PPS, Urethane, Nylon, PEI, PES, PEK, as well as in combination with other material enhancements such as nano-particulate inclusions. Furthermore, these materials may also contain fibers which include but are not limited to pan carbon, pitch carbon, s-fiberglass, e-fiberglass, quartz, LCP, M5, and ceramic.

Figure 1C:
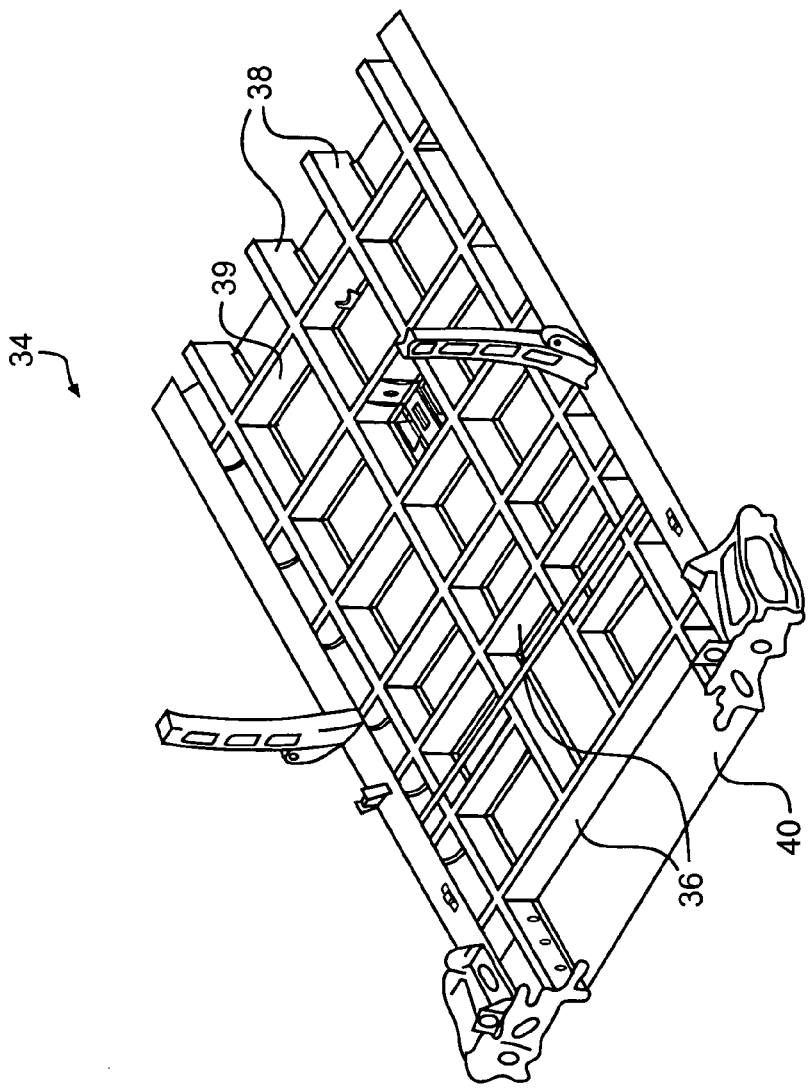
FIG. 1C is a general perspective view an airframe structure section of the cabin section of FIG. 1B.

Referring to FIG. 1C, the airframe structure section 34 includes a multitude of thermoplastic matrix beam members 36 and a multitude of thermoplastic matrix frame members 38 which form a substructure 39 to receive a thermoplastic matrix outer skin 40. The thermoplastic matrix outer skin 40 is preferably coplanar to, and forms a section of, the aircraft outer skin 28. That is, the thermoplastic matrix outer skin 40 may abut or be directly attached to other adjoining outer skin sections such that the outer skin 28 need not be formed of a single material. Thus, the thermoplastic matrix outer skin 40 may abut other airframe structural sections which utilize, for example, an aluminum or composite skin to form in combination the aircraft outer skin 28.

As shown, the substructure 39 is preferably arranged in a generally rectilinear grid pattern. As used herein "grid" is defined as a plurality of generally transverse thermoplastic matrix beam members 36 and thermoplastic matrix frame members 38 which are attached together but may have unequal and non right-angle spacing. However, as readily appreciated by one of ordinary skill in the art, the substructure may be of other shapes and configurations.

The outer thermoplastic matrix skin 40 forms an outer surface of the airframe structure section 34. Alternatively, the skin may be a metallic or composite material which is fastened or bonded to the substructure 39 in a conventional manner.

Figure 2:
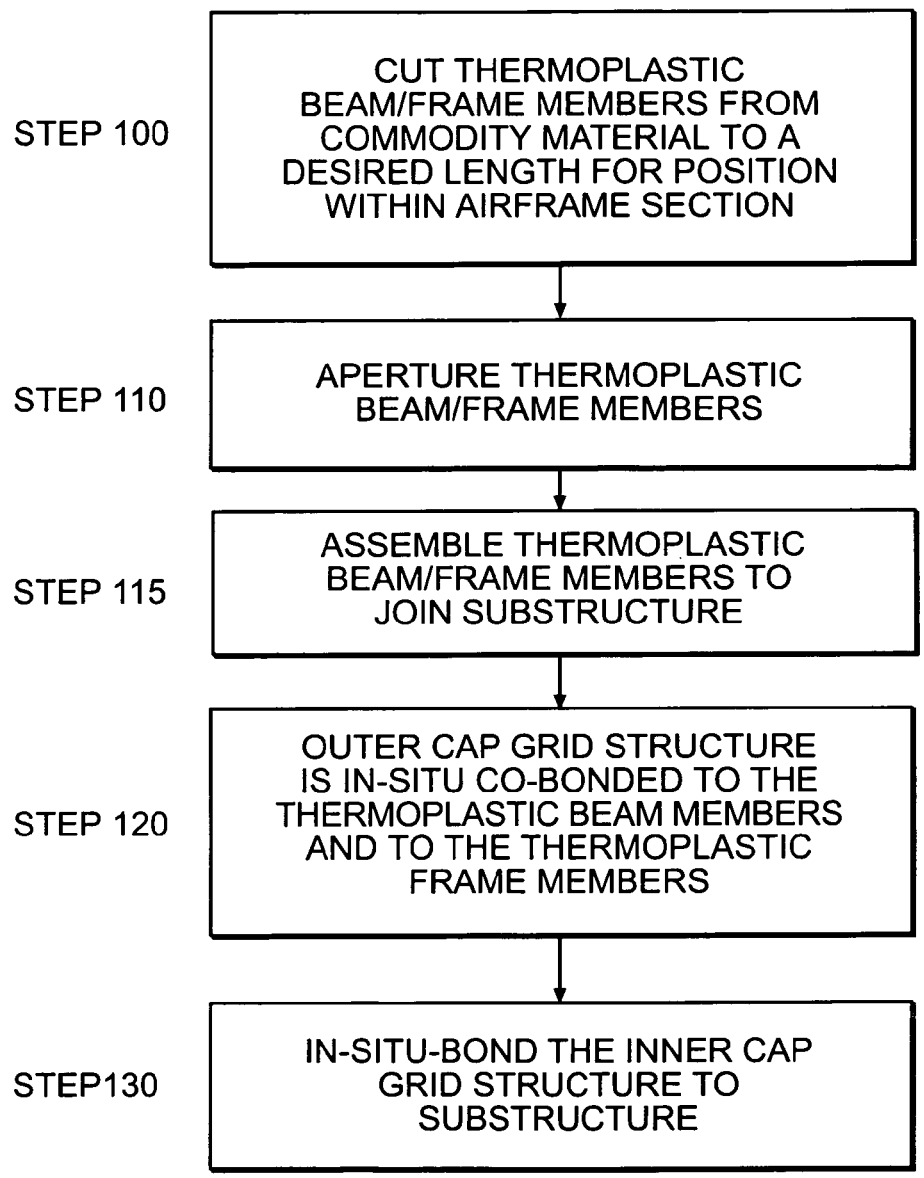
FIG. 2 is a flow chart of a method of assembly of an airframe structure section of the present invention.
Figure 3:
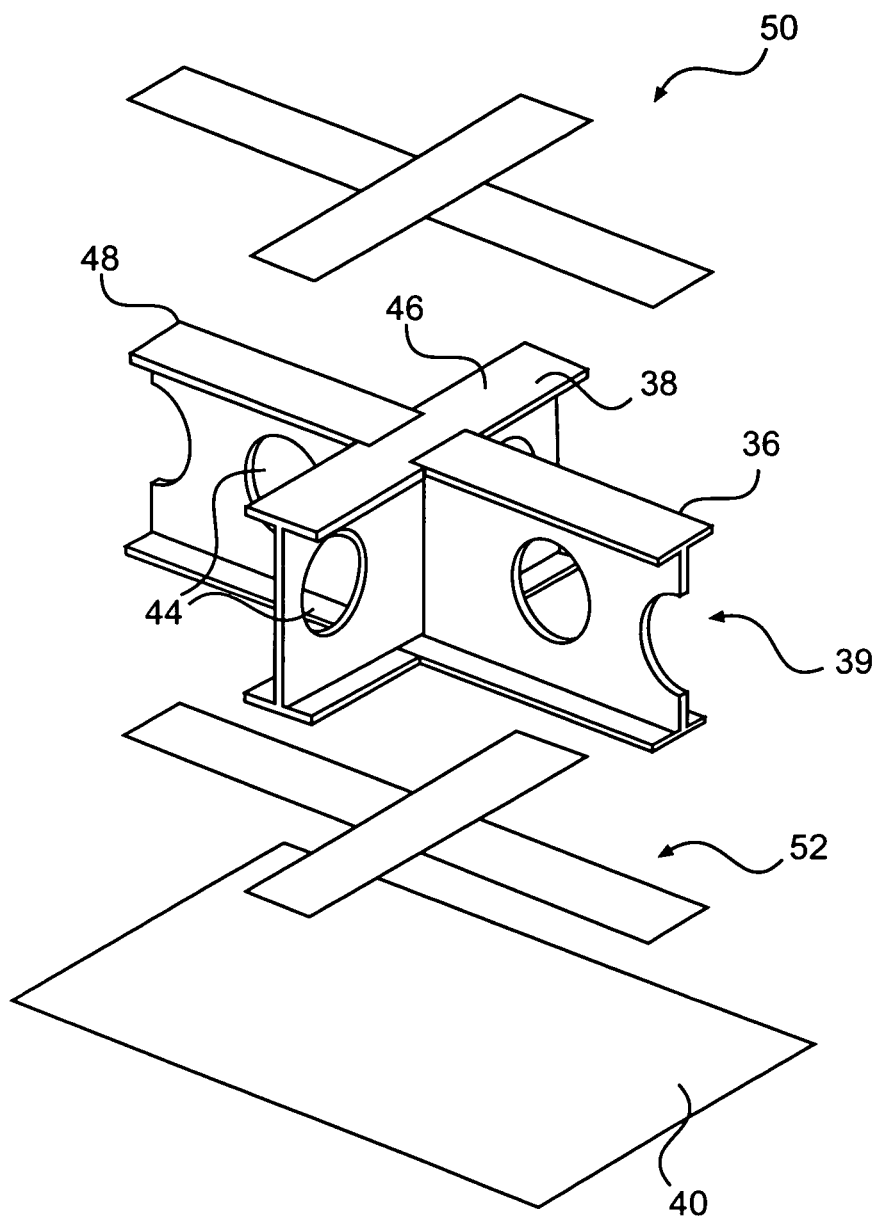
FIG. 3 is an exploded view an airframe structure section interface.

Referring to FIGS. 2 and 3, an innovative method for manufacturing the airframe structure section 34 will now be described. Each of the thermoplastic matrix beam members 36 may be a single continuous member to which the thermoplastic matrix frame members 38 are joined and/or bonded. It should be understood that the opposite arrangement may also be utilized in accordance with the present invention; however as described herein, the thermoplastic matrix beam members 36 shall be described as the continuous members to which the thermoplastic matrix frame members 38 are attached as generally understood in airframe manufacture.

The thermoplastic matrix frame member 38 and the thermoplastic matrix beam member 36 are preferably cut to length from a commodity-type beam and frame member, respectively, for assembly into the substructure (step 100). That is, the specific length of the thermoplastic matrix frame members 38 and the thermoplastic matrix beam members 36 are preferably cut to length for a desired installation position from a pre-made commodity-type thermoplastic matrix member rather than being specifically fabricated as a multitude of discretely tailored components which are destined for only a few or single specific locations within the airframe section. Thus, each beam member 36 and each frame member 38 may be of the same shape and size rather than having a particular dimension for each specific location within the airframe structure, which in turn would require a discrete mold, trim, fixture, and ply location tools or templates. An assembly manufactured from commodity-type components may weigh slightly more than an assembly with components specifically manufactured for specific locations and interface arrangements, but provides a significant cost benefit. Furthermore, such weight penalties, even if they result may be offset by the more efficiently produced commodity-type components.

Although the cross-sectional shapes are illustrated as an "I" or "T," they may assume other cross-sectional configurations. Such other shapes may include but are not limited to "L," "Z," "C," "J," etc.

Subsequent to being cut to length, each thermoplastic matrix frame member 38 and each thermoplastic matrix beam member 36 may have apertures 44 drilled or cut (step 110) as desired to provide weight-reduction and/or openings for components such as control rods, conduits, hoses, wiring harnesses, etc. which pass through the airframe structure section 34.

Once individually cut to length and apertured, the outer and/or inner cap grid structures 50,52 may be in-situ co-bonded to the multitude of thermoplastic matrix frame members 38 and the multitude of thermoplastic matrix beam members 36. Subsequently, the multitude of thermoplastic matrix frame members 38 and the multitude of thermoplastic beam members 36 may be joined and/or bonded to each other to form a grid-like substructure. Thereafter, the remaining cap grid structure 50, 52 may be in-situ co-bonded to the multitude of thermoplastic matrix frame members 38 and the multitude of thermoplastic matrix beam members 36. It should be noted that alternate arrangements are envisioned, for example, the multitude of thermoplastic matrix frame members 38 and the multitude of thermoplastic beam members 36 may be joined and/or bonded to each other prior to co-bonding the inner and outer cap grid structures 50, 52, to the grid-like structure. Furthermore, the inner and outer grid structures 50, 52 may be in-situ co-bonded to the multitude of thermoplastic matrix frame members 38 and the multitude of thermoplastic beam members 36 prior to joining the frames and beams to each other. It should be understood that other attachment arrangements and methods such as mechanical fasteners, bonding or autoclave processing will likewise be utilized. That is, various attachment arrangements and methods may be utilized in conjunction with other attachment arrangements and method depending upon various factors such as location, strength, and cost.

Figure 5:
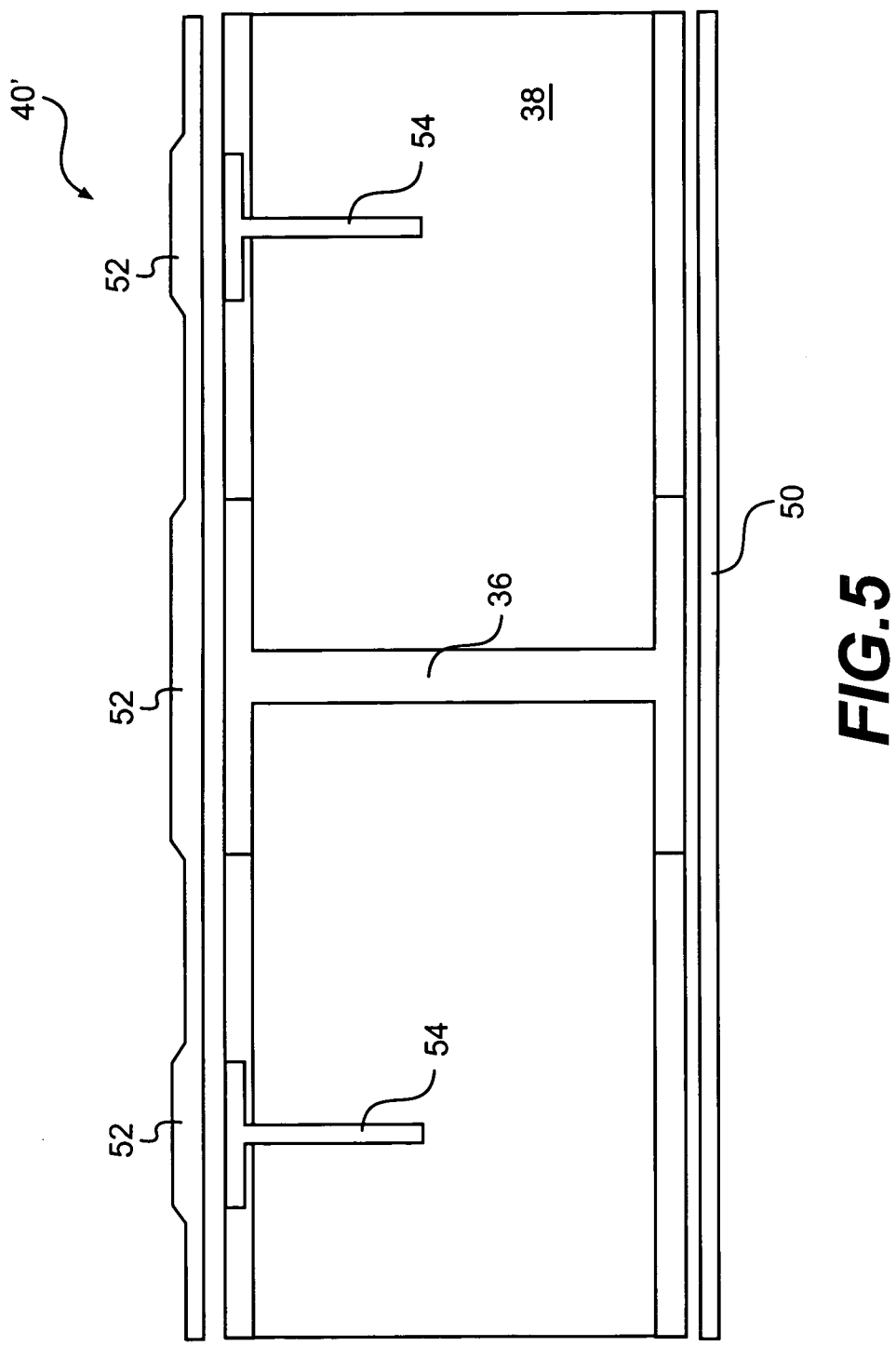
FIG. 5 is a sectional view of an airframe structure section interface.

Alternatively, the thermoplastic matrix outer skin 40 may be integrally formed with the outer cap grid structure 52. That is, for example, the thermoplastic matrix outer cap grid structure 52 may be contained within the thermoplastic matrix outer skin 40 (FIG. 5). More specifically, the thermoplastic matrix outer skin 40 may include reinforced areas represented by the thermoplastic matrix outer cap grid structure 52.

Figure 4:
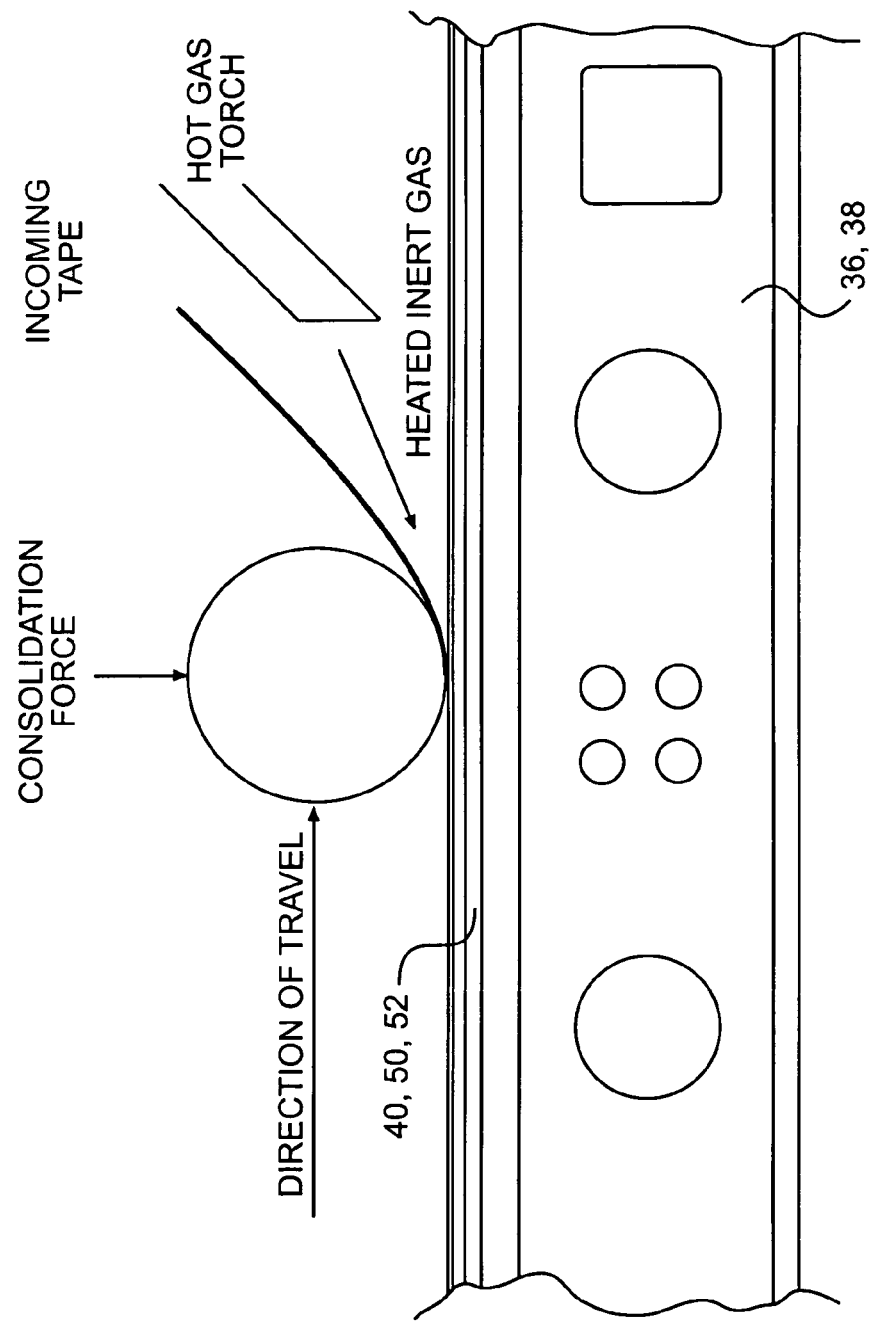
FIG. 4 is a schematic view of in-situ processing of thermoplastic tape or tow for use in manufacturing the airframe structure section of the present invention.

Preferably, it is envisioned, that the outer cap grid structure 52 and the thermoplastic outer skin 40 will be intermeshed and will be in-situ co-bonded to the multitude of cut to length and apertured frame members 38 and the multitude of cut to length and apertured beam members 36. Alternatively, the outer cap grid structure 52 and thermoplastic matrix outer skin 40 may be simultaneously in-situ co-bonded to the multitude of frame members 38 and the multitude of beam members 36. Furthermore, the outer cap grid structure 52 may be integrally formed with the thermoplastic matrix outer skin 40 (as described above). The thermoplastic matrix outer cap grid structure 52 is preferably applied through in-situ processing of thermoplastic tape or tow (process schematically illustrated in FIG. 4 and described below).

Thereafter, the multitude of thermoplastic matrix frame members 38 are preferably joined and/or bonded to the multitude of thermoplastic matrix beam members 36. The bonded thermoplastic matrix frame members 38 and thermoplastic matrix beam members 36 are assembled to form the grid-like substructure 39. It should be understood, however, that various sub-structural shapes may be manufactured in accordance with the present invention.

The multitude of thermoplastic matrix frame members 38 and the multitude of thermoplastic matrix beam members 36 may be joined to each other by any means known in the art including but not limited to bonding, fusing, etc. Preferably, however, the multitude of thermoplastic matrix frame members 38 and the multitude of thermoplastic matrix beam members 36 are joined together by mechanical or bonded clips at the frame to beam intersection.

Preferably, an outer beam cap surface 46 of the multitude of thermoplastic matrix frame members 38 and an outer frame cap surface 48 of the multitude of thermoplastic matrix beam members 36 are generally coplanar (FIG. 3). That is, the outer cap surfaces 46, 48 provide a substantially flat surface to receive the thermoplastic matrix inner cap grid structure 50, thermoplastic matrix outer cap grid structure 52, and the thermoplastic matrix outer skin 40.

Once the substructure 39 has been assembled from the multitude of thermoplastic matrix beam members 36 and the multitude of thermoplastic matrix frame members 38, and once the substructure 39 has bonded to the thermoplastic matrix outer cap grid structure 52, as described above, the thermoplastic matrix inner cap grid structure 50 may be in-situ co-bonded thereto (step 130). Alternatively, the multitude of thermoplastic matrix beam members 36 and multitude of thermoplastic matrix frame members 38 may be in-situ co-bonded to both the outer cap grid structure 52 and the inner cap grid structure 50 prior to joining the beam and frame members 36, 38 together. As with the thermoplastic matrix outer cap grid structure 52 described above, the thermoplastic matrix inner cap grid structure 50 may be applied through in-situ processing of thermoplastic tape or tow (process schematically illustrated in FIG. 4). The in-situ process joins one thermoplastic layer to another on the fly, eliminating the need for autoclave preparation and subsequent post processing. One such in-situ process is that provided by ADC Acquisition Company, doing business as Automated Dynamics, of Schenectady, N.Y., USA. It should be understood that multiple plies or layers of thermoplastic tape or tow may be applied to provide a desired rigidity as generally understood.

Preferably, the thermoplastic matrix inner cap grid structure 50 and the thermoplastic matrix outer cap grid structure 52 each include a multitude of transverse plies which form a planar grid which follows the outer beam cap surface 46 of the multitude of thermoplastic matrix frame members 38 and the outer frame cap surface 48 of the multitude of thermoplastic matrix beam members 36. That is, the thermoplastic matrix inner cap grid structure 50 and the thermoplastic matrix outer cap grid structure 52 tie together the outer cap surfaces 46, 48 of the multitude of thermoplastic matrix frame members 38 and the multitude of thermoplastic matrix beam members 36 to increase the stiffness and rigidity thereof which significantly strengthens and unifies the substructure 39. The thermoplastic matrix inner cap grid structure 50 and the thermoplastic matrix outer cap grid structure 52 follow the thermoplastic matrix beam members 36 and the thermoplastic matrix frame members 38, while the thermoplastic matrix outer skin 40 covers the substructure 39. The thermoplastic matrix outer skin 40 is preferably in-situ placed with 100% coverage of the substructure 39 while the thermoplastic matrix inner cap grid structure 50 coverage is preferably placed only in the areas of the cap surfaces 46, 48 which may only represent approximately 10% coverage.

It should be understood that although a preferred order was disclosed, other in-situ co-bonding orders may also be usable with the present invention.

Figure 6:
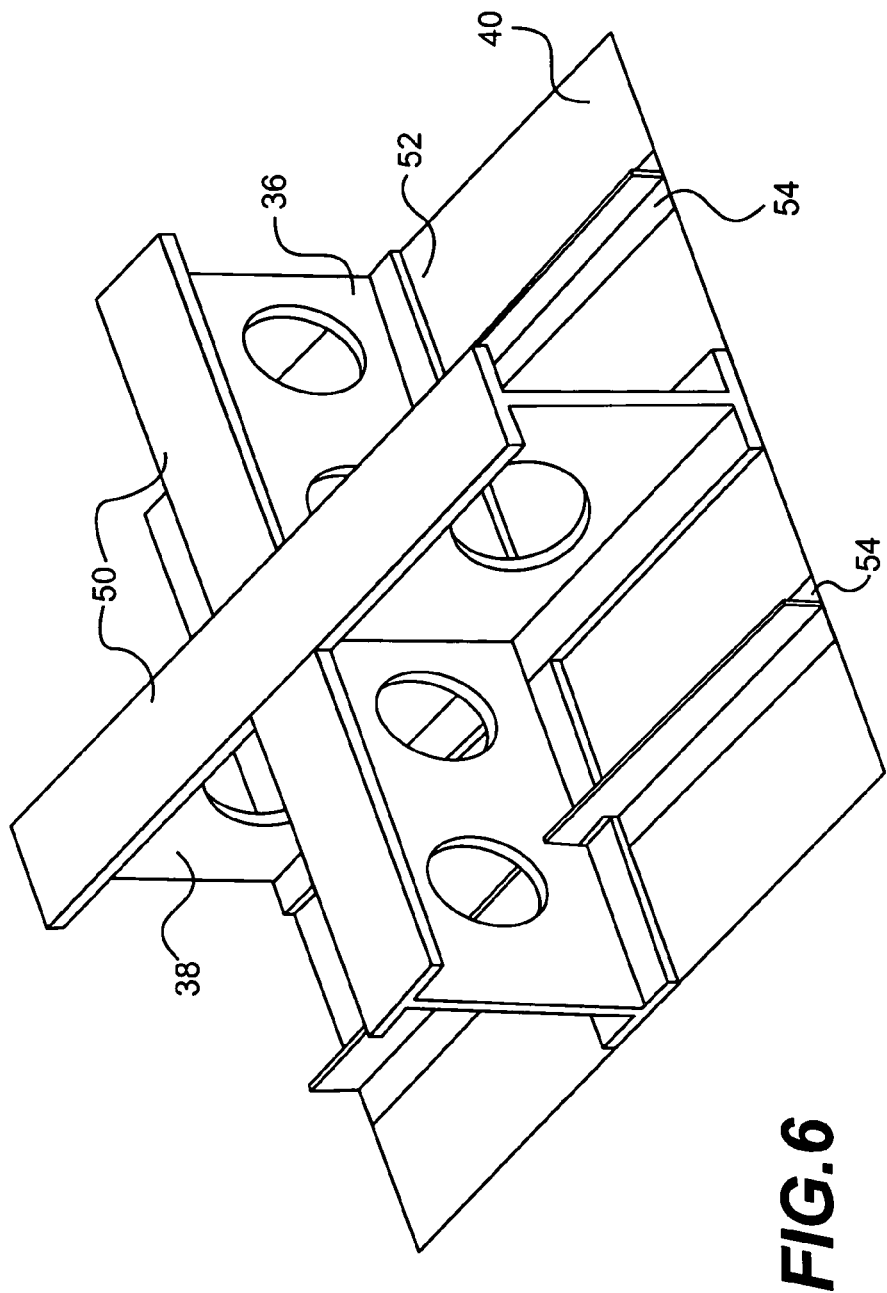
FIG. 6 is a perspective view of another airframe structure section interface of the present invention.

Alternatively, or in addition, a multitude of thermoplastic matrix stringers 54 are preferably co-bonded to the thermoplastic matrix outer skin 40 (FIGS. 5 and 6). The multitude of thermoplastic stringers 54 may be bonded as described above. The multitude of thermoplastic stringers 54 are bonded either subsequent to or concurrent with application of the thermoplastic matrix outer cap grid structure 52 and the thermoplastic matrix outer skin 40. Although the stringer's geometry 54 is depicted herein in the form of a "T", other geometry configurations may be substituted. It should be understood that other details may also be molded or assembled into the substructure 39 and/or integrated with the thermoplastic matrix outer skin 40.

Automated composite manufacturing technologies have evolved to a level of maturity which produce cost effective structural airframe components. Through the use of automation, composite airframe details capitalize on manufacturing economies of scale to achieve lower cost structures. Hence, the structures become engineered commodity products. At the assembly level, in-situ thermoplastic fiber placement allows skin integration to the substructure on the fly without subsequent autoclave post processing. Assembly touch labor of structure to skin joining is thereby essentially eliminated.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in another order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of manufacturing a composite airframe structure section comprising:
    assembling a thermoplastic matrix substructure from a multitude of thermoplastic matrix beams and a multitude of thermoplastic matrix frames to form a grid structure;
    in-situ co-bonding a thermoplastic matrix skin to overlay the entire thermoplastic matrix substructure; and
    in-situ co-bonding a thermoplastic matrix inner cap grid structure which defines a grid to overlay only the multitude of thermoplastic matrix beams and the multitude of thermoplastic matrix frames of the thermoplastic matrix substructure, the thermoplastic matrix inner cap grid structure opposite the thermoplastic matrix skin.

2. The method as recited in claim 1, wherein assembling the thermoplastic matrix substructure further comprises:
    bonding the multitude of thermoplastic beams to the multitude of thermoplastic frames, at least one of the multitude of thermoplastic matrix beams being mounted substantially transverse to at least one of the multitude of thermoplastic matrix frames such that the thermoplastic matrix substructure forms a substantially coplanar surface to receive the thermoplastic matrix skin.

3. The method as recited in claim 1, wherein said in-situ co-bonding the thermoplastic matrix skin further comprises:
    locating a multitude of thermoplastic matrix stringers to the multitude of thermoplastic matrix beam members; and
    in-situ co-bonding the multitude of thermoplastic matrix stringers to the thermoplastic matrix skin.

4. A method of manufacturing a composite airframe structure section comprising:
    cutting a multitude of thermoplastic matrix beam members from a commodity-type beam member;
    cutting a multitude of thermoplastic matrix frame members from a commodity-type frame member;
    assembling a thermoplastic matrix substructure from the multitude of thermoplastic beams and the multitude of thermoplastic frames to form a grid structure;
    in-situ co-bonding a thermoplastic matrix outer skin structure to an outer surface of the multitude of thermoplastic matrix beam members and to an outer surface of the multitude of thermoplastic matrix frame members to overlay the entire thermoplastic matrix substructure; and
    in-situ co-bonding a thermoplastic matrix cap grid structure to an inner surface of the multitude of thermoplastic matrix beam members and to an inner surface of the multitude of thermoplastic matrix frame members to overlay only the multitude of thermoplastic matrix beams and the multitude of thermoplastic matrix frames of the thermoplastic matrix substructure, wherein the thermoplastic matrix cap grid structure is opposite the thermoplastic matrix outer skin structure.

5. The method as recited in claim 4, further comprising:
    joining at least one of the multitude of thermoplastic matrix beam members to at least one of the multitude of thermoplastic matrix frame members prior to in-situ co-bonding the thermoplastic matrix outer skin.

6. The method as recited in claim 4, further comprising:
    attaching the thermoplastic matrix outer skin to an outer thermoplastic matrix cap grid structure such that the outer thermoplastic matrix cap grid structure is between the thermoplastic matrix substructure and the thermoplastic matrix outer skin.

7. A method as recited in claim 6, wherein attaching the thermoplastic matrix outer skin further comprises:
    mechanically fastening the outer thermoplastic matrix cap grid structure to the thermoplastic matrix outer skin.

8. A method as recited in claim 6, wherein attaching the thermoplastic matrix outer skin further comprises:
    bonding the outer thermoplastic matrix cap grid structure to the thermoplastic matrix outer skin.

9. A method as recited in claim 6, wherein attaching the thermoplastic matrix outer skin further comprises:
    autoclave processing the outer thermoplastic matrix cap grid structure to the thermoplastic matrix outer skin.

10. A method as recited in claim 6, wherein attaching the thermoplastic matrix outer skin further comprises:
    integrally forming the outer thermoplastic matrix cap grid structure with the thermoplastic matrix outer skin.

11. A method as recited in claim 6, further comprising:
    in-situ co-bonding the outer thermoplastic matrix cap grid structure.

12. A method as recited in claim 6, wherein the outer thermoplastic matrix cap grid structure is formed within the thermoplastic matrix outer skin structure opposite the thermoplastic matrix substructure.

13. The method as recited in claim 1, further comprising:
    forming the thermoplastic matrix inner cap grid structure from a multitude of transverse plies to form a planar grid.

14. The method as recited in claim 1, further comprising:
    aperturing the multitude of thermoplastic matrix beams and the multitude of thermoplastic matrix frames.

15. The method as recited in claim 1, further comprising:
    in-situ co-bonding a thermoplastic matrix outer cap grid structure which defines a grid to overlay only the multitude of thermoplastic matrix beams and the multitude of thermoplastic matrix frames, the thermoplastic matrix outer cap grid structure located between the thermoplastic matrix substructure and the thermoplastic matrix skin.

16. The method as recited in claim 4, further comprising:
    aperturing the multitude of thermoplastic matrix beams and the multitude of thermoplastic matrix frames.

17. The method as recited in claim 4, further comprising:
in-situ co-bonding a thermoplastic matrix outer cap grid structure which defines a grid to overlay only the multitude of thermoplastic matrix beams and the multitude of thermoplastic matrix frames, the thermoplastic matrix outer cap grid structure located between the thermoplastic matrix substructure and the thermoplastic matrix skin.

18. A method of manufacturing a composite airframe structure section comprising:
assembling a thermoplastic matrix substructure from a multitude of thermoplastic matrix beams and a multitude of thermoplastic matrix frames to form a grid structure;
in-situ co-bonding a thermoplastic matrix outer cap grid structure which defines an outer grid to overlay only the multitude of thermoplastic matrix beams and the multitude of thermoplastic matrix frames of the thermoplastic matrix substructure;
in-situ co-bonding a thermoplastic matrix skin to the thermoplastic matrix outer cap grid structure to overlay the entire thermoplastic matrix sub structure and
in-situ co-bonding a thermoplastic matrix inner cap grid structure which defines an inner grip to overlay only the multitude of thermoplastic matrix beams and the multitude of thermoplastic matrix frames of the thermoplastic matrix substrate, wherein the thermoplastic matrix inner cap grid structure is opposite the thermoplastic matrix skin when in-situ co-bonding the thermoplastic matrix inner cap grid structure.

19. The method as recited in claim 18, further comprising:
cutting each of the multitude of thermoplastic matrix beam members to a predefined length from a commodity-type beam member; and
cutting each of the multitude of thermoplastic matrix frame members to a predefined length from a commodity-type frame member.

20. The method as recited in claim 19, further comprising:
aperturing the multitude of thermoplastic matrix beams and the multitude of thermoplastic matrix frames.

\* \* \* \* \*

UNITED STATES PATENT AND TRADEMARK OFFICE
CERTIFICATE OF CORRECTION

| | | |
|---|---|---|
| PATENT NO. | : 8,920,594 B2 | Page 1 of 1 |
| APPLICATION NO. | : 11/493052 | |
| DATED | : December 30, 2014 | |
| INVENTOR(S) | : Thomas Carstenen et al. | |

It is certified that error appears in the above-identified patent and that said Letters Patent is hereby corrected as shown below:

IN THE CLAIMS:

In claim 18, column 10, line 2; delete "grip" and insert --grid--

In claim 18, column 10, line 5; delete "substrate" and insert --substructure--

Signed and Sealed this
Thirty-first Day of March, 2015

Michelle K. Lee
*Director of the United States Patent and Trademark Office*